INVENTOR.
John F. Pribonic

INVENTOR.
John F. Pribonic
BY
C. L. Staley
His Attorney

Oct. 23, 1962  J. F. PRIBONIC  3,059,918
MULTIPLE POSITION AIR SUSPENSION CONTROL SYSTEM
Filed May 12, 1960  3 Sheets-Sheet 3

INVENTOR.
John F. Pribonic
BY
*D. L. Staley*
His Attorney 3,059,918
MULTIPLE POSITION AIR SUSPENSION CONTROL SYSTEM
John F. Pribonic, Dayton, Ohio, assignor to General Motors Corporation, Detroit, Mich., a corporation of Delaware
Filed May 12, 1960, Ser. No. 28,654
7 Claims. (Cl. 267—65)

This invention relates to air suspension systems adapted for use on motor vehicles and particularly to the controls for the air suspension system by which it is possible to establish and maintain different values of clearance height relation between the sprung mass and the unsprung mass of the vehicle, and even more particularly to the control valve by which different clearance height relations can be established and maintained.

The use of fluid springs to replace conventional steel springs between the sprung mass and the unsprung mass of a vehicle to support the chassis and body of the vehicle upon the running gear for the same is now well-known in the art. These fluid springs usually consist of an expansible chamber that receives a fluid, preferably air, under pressure to establish a predetermined fluid pressure in the fluid springs sufficient to support the chassis of a vehicle upon the running gear, the body of air in the air spring being utilized as the resilient means for supporting the chassis upon the running gear of the vehicle.

To maintain clearance height between the sprung mass and the unsprung mass of a vehicle at a relatively constant value, control valves are provided for regulating the air for fluid under pressure to the fluid springs and exhausting air or fluid from the fluid springs in response to a change in clearance height between the sprung mass and the unsprung mass of the vehicle. These control valves are conventionally carried on the chassis of the vehicle with suitable linkage connecting the control valves with the axle or running gear of the vehicle so that internal valve mechanism within the control valve will be actuated upon a change of clearance height between the body and the running gear of the vehicle to supply air to the fluid springs when the predetermined clearance height is decreased for any reason, such as an increase of load in the body of the vehicle, or loss of air from the air springs. Similarly, the control valves exhaust air from the air springs when the predetermined clearance height is increased, such as when the load within the vehicle is decreased. The result is that a relatively constant clearance height is established and maintained between the chassis of the vehicle and the running gear.

While under ordinary road conditions, it is possible to maintain one predetermined clearance height of the vehicle using fluid spring suspension systems, yet it is desirable under certain conditions to be able to increase the clearance height between the sprung mass and the unsprung mass somewhat above the normal clearance height. It is also desirable sometimes to be able to operate the vehicle at this increased clearance height until the difficult situation has been avoided or eliminated. Such conditions occur when a low road clearance vehicle is placed upon an old style grease rack hoist or when traveling over deeply rutted or highly crowned roads. It is, therefore, desirable to have the suspension system arranged so that the clearance height can be increased under certain conditions, the air suspension system incorporating valve means that regulate the supply and exhaust of fluid to and from the fluid spring that is capable of establishing and maintaining one predetermined selected clearance height between the sprung mass and the unsprung mass of the vehicle when operating under normal road conditions, and which is adapted to be actuated at the discretion of the operator of the vehicle to operate the valve mechanism in a manner to cause it to increase the clearance height under the selective control of the operator.

It is, therefore, an object of this invention to provide a fluid suspension system and control valve means for the same wherein the system is arranged such that it will provide for a normal predetermined clearance height between the sprung mass and the unsprung mass of the vehicle and an above normal provision in which the clearance height is increased, and to include control valve means in the fluid suspension system which is actuated under the selective control of the operator of the vehicle to establish and maintain selectively the clearance height of different value between the sprung mass and the unsprung mass of the vehicle.

It is still another object of the invention to provide a fluid suspension system that includes a height control or leveling valve regulating supply and exhaust of fluid to and from a fluid spring in a manner to maintain the first normal predetermined clearance height between the sprung mass and the unsprung mass of the vehicle, and wherein the fluid suspension system includes operated valve means for supplying high-pressure fluid to the exhaust side of the control valve means for the suspension system to apply high-pressure air or fluid to the fluid springs through the exhaust side of the control valve, and wherein the control valve is provided with a first normally opened valve and a second normally closed valve arranged such that the first normally closed valve establishes and maintains one maximum value of clearance height between the sprung mass and the unsprung mass, and wherein the second exhaust valve provides for establishing and maintaining a second and above normal clearance height relation between the sprung mass and the unsprung mass of the vehicle.

Still another object of the invention is to provide a fluid suspension system and control valve means for the same in accordance with the foregoing object wherein the first mentioned exhaust valve is actuated to open to exhaust fluid from the fluid springs at a predetermined maximum clearance height between the sprung mass and the unsprung mass of the vehicle, and wherein the second exhaust valve is actuated in response to an additional increase in clearance height between the sprung mass and the unsprung mass of the vehicle to close off supply of fluid under pressure to the fluid spring of the fluid suspension system when the sprung mass of the vehicle reaches a predetermined additional clearance height above normal, the second exhaust valve maintaining the second above normal clearance height relation between the sprung mass and the unsprung mass of the vehicle so long as fluid under pressure is supplied to the control valve of the fluid suspension system through the exhaust side of the control valve.

Further objects and advantages of the present invention will be apparent from the following description, reference being had to the accompanying drawing wherein preferred embodiments of the invention are clearly shown.

Figure 1:
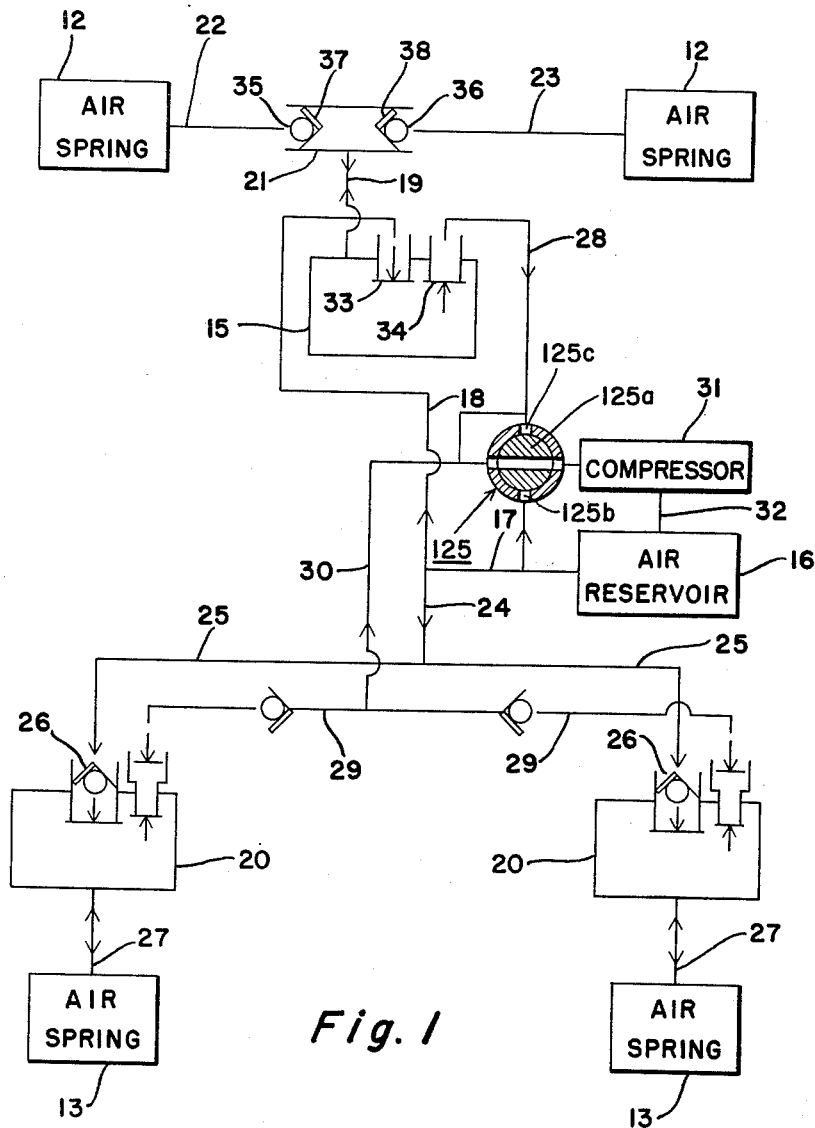
FIGURE 1 is a schematic view of an air suspension system for a motor vehicle incorporating control valve means for regulating clearance height relation of the sprung mass and the unsprung mass of the vehicle and for changing the clearance height relation.

FIGURE 1 illustrates schematically a vehicle incorporating the fluid or air suspension system with the sprung mass of the vehicle being supported upon the running gear or axle structure of the vehicle by means of air springs, the air springs being under control or regulation of a control valve adapted to respond to changes in clearance height between the sprung mass and the unsprung mass of the vehicle.

In the schematic illustration of FIGURE 1, the vehicle chassis frame or sprung mass is supported upon the axle structure or unsprung mass of the vehicle by means of air springs 12 placed at each of opposite sides at the front end of a vehicle and air springs 13 placed at each of opposite sides at the rear of the vehicle. The air springs 12 and 13 are preferably expansible bellows type of units adapted to receive air under pressure sufficient to support the load of the chassis upon the axle structure. When the load in the sprung mass is increased, air under pressure is supplied to the air springs 12 and 13 to offset the increase in load and thereby maintain the clearance height between the sprung mass and the unsprung mass at a relatively constant value. Similarly, when the load in the vehicle decreases, air is exhausted from the air springs 12 and 13 to again compensate for the loss of load to maintain the clearance height at a relatively constant value.

The clearance height between the sprung mass and the unsprung mass of the vehicle is regulated by means of a fluid or air control valve 15 that is connected with the chassis of the vehicle. The control valve is actuated by linkage connected with the axle structure of the vehicle in a manner to be hereinafter described. Similarly, fluid or air control valves 20 are provided at each of opposite sides at the rear of the vehicle to control the supply and exhaust of fluid or air to and from the air springs 13. Here also, the control valves 20 are connected with the chassis or sprung mass of the vehicle and are connected with the axle structure or unsprung mass by suitable linkage whereby the valve mechanism is operated in response to change in clearance height between the sprung mass and the unsprung mass of the vehicle.

Air under pressure is supplied to the control valve 15 at the front of the vehicle from an air reservoir 16 through the lines 17, 18 and 19 to a T-connection 21 from which the lines 22 and 23 supply the air springs at opposite sides of the vehicle at the front thereof. Similarly, air under pressure is supplied to the control valves 20 at the rear of the vehicle through the line 17 and the lines 24 and 25 to the inlet valves 26 of the control valves 20, and thence to the air springs 13 through the lines 27.

Exhaust of fluid under pressure from the air springs 12 at the front of the vehicle is by way of the control valve 15 through the exhaust line 28. Similarly, exhaust of fluid under pressure from the air springs 13 at the rear of the vehicle is by way of the exhaust lines 29 and 30 for return to the fluid compressor 31 which is connected with the reservoir by the line 32 to maintain an air supply of predetermined pressure value in the reservoir 16.

The control valve 15 is provided with an inlet valve 33 and an exhaust valve 34 that are opened and closed in response to actuation by a valve operating mechanism contained within the valve body to admit air to the springs or exhaust air therefrom in response to changes in clearance height at the front end of the vehicle to establish and maintain a relatively constant clearance height at the front of the vehicle.

The connection fitting 21 is provided with reversely acting check valves 35 and 36 to prevent cross flow of air between the air springs 12 at opposite sides at the front of the vehicle, resistance passages 37 and 38 being provided to bypass the valves to allow exhaust of air from the respective air springs.

The control valves 20 placed at the rear of the vehicle are more particularly illustrated in FIGURES 2 to 5 inclusive wherein the control valves 20 are constructed and arranged in a manner that two selective positions of clearance height values between the sprung mass and the unsprung mass can be maintained depending upon selective operation by the operator of the vehicle.

The control valves 20 each consists of a valve body 50 having a chamber 51 that receives the operating mechanism of the control valve.

The valve body 50 is provided with an inlet port 52 which is connected to the reservoir 16 by the conduit 25. The inlet port 52 has a control valve 53 that is a conventional tire valve type, the valve normally remaining closed under static conditions of the vehicle to prevent flow of fluid or air pressure from the inlet port 52 into the valve chamber 51. The valve 53 has a valve stem 54 engaged by the valve operating member 55 which is adapted to open the valve 53 on upward movement of the valve operating member 55, as viewed in FIGURES 2 and 4.

The valve body 50 also has an exhaust port 56 adapted for connection to the compressor by way of the conduit 29. The exhaust port 56 is provided in a valve body member 57 threadedly received in the boss 58 of the valve body 50, the lower end of the member 57 extending into the chamber 59.

The chamber 59 of the valve body is adapted to connect with the chamber 51 through means of a first exhaust valve 60 positioned in a passage 61 between the chambers 59 and 51. This valve 60 is of a conventional tire type construction having the valve end 62 normally closing on the body of the valve 60 to prevent flow of fluid or air from the chamber 51 into the chamber 59, and thereby prevent escape of fluid under pressure from the air springs 20 controlled thereby.

The valve closure element 62 of the first exhaust valve 60 is carried on a valve stem 63 that has a portion 63a extending below the valve closure element 62 and receiving thereon a flanged member 64 secured on the end thereof. The valve operating member 55 has the extension portion 55a that operates the inlet valve 53 that has the extension portion 55b for operating the exhaust valve 60.

Figure 2:
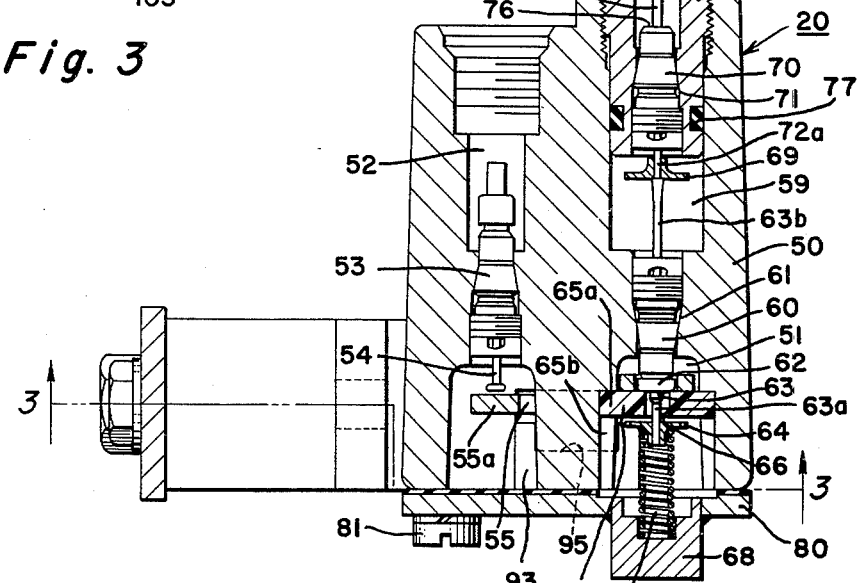
FIGURE 2 is a transverse cross-sectional view of a control valve for regulating and maintaining clearance height between the sprung mass and the unsprung mass incorporating features of the invention, taken along line 2—2 of FIGURE 3.
Figure 4:
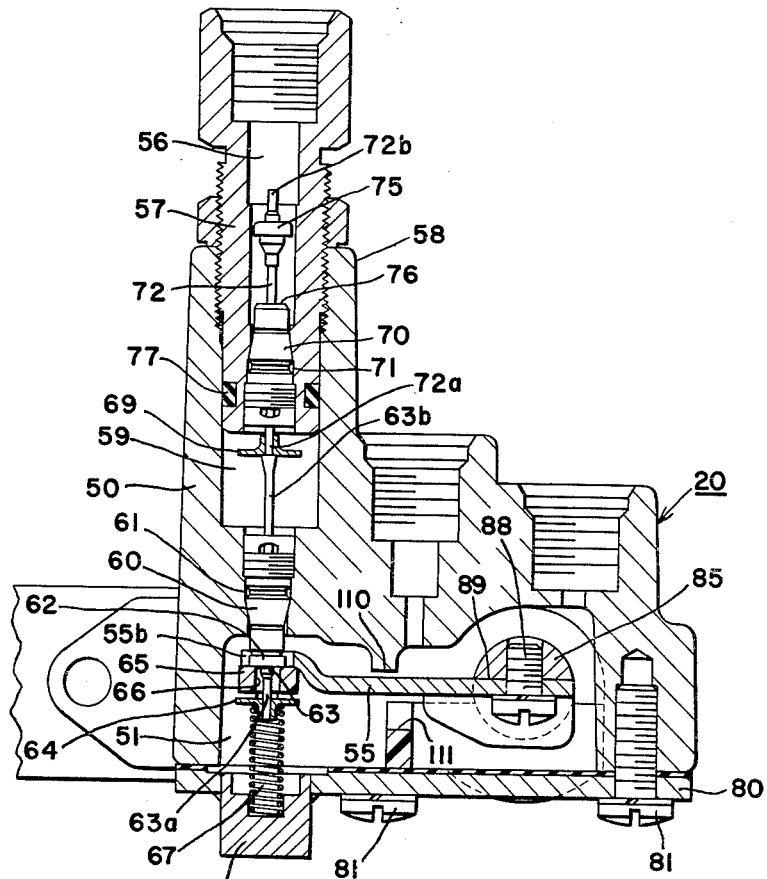
FIGURE 4 is a cross-sectional view of the control valve taken along line 4—4 of FIGURE 3.
Figure 5:
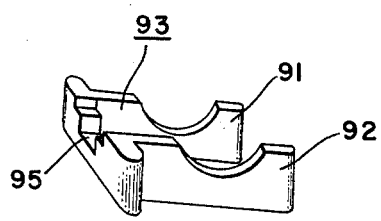
FIGURE 5 is a perspective view of one of the detail elements of the control valve.

The exhaust valve 60 has a nylon guide member 65 engaged by the operating extension 55b, the end portion 63a of the valve stem extending through the hole 66 in the center of the guide member 63. The guide member 65 is adapted to engage the flanged member 64 to move the member 64 and the stem portion 63a downwardly against the compression spring 67 to open the closure valve element 62 of the exhaust valve 60 on predetermined downward movement of the valve actuating member 55, as viewed in FIGURES 2 and 4. The compression spring 67 seats against a retainer 68 and normally positions the exhaust valve element 62 in engagement with the end of the body of the exhaust valve 60, as shown in FIGURES 2 and 4.

The nylon guide member 65 has radially extending portions 65a that slide in slots 65b for guiding of member 65 in its reciprocal movement in the valve body.

The exhaust valve member 60 has an upwardly extending stem portion 63b adapted to engage a flanged member 69 of a second exhaust valve 70 that is received within the passage 71 provided in the member 57. The flanged member 69 is carried on the end portion 72a of a valve stem 72. The upper end portion 72b of the valve stem 72 carries a closure valve element 75 that normally is maintained in spaced relationship to the valve seat 76 on the valve body 70. Thus, the second exhaust valve member 70 is normally held in open position to allow for free flow of fluid under pressure from chamber 59 into the exhaust port 56. An O-ring 77 seals between the member 57 and the wall of the chamber 59.

The valve chamber 51 is closed by a cover plate 80 secured to the body by screws 81.

Figure 3:
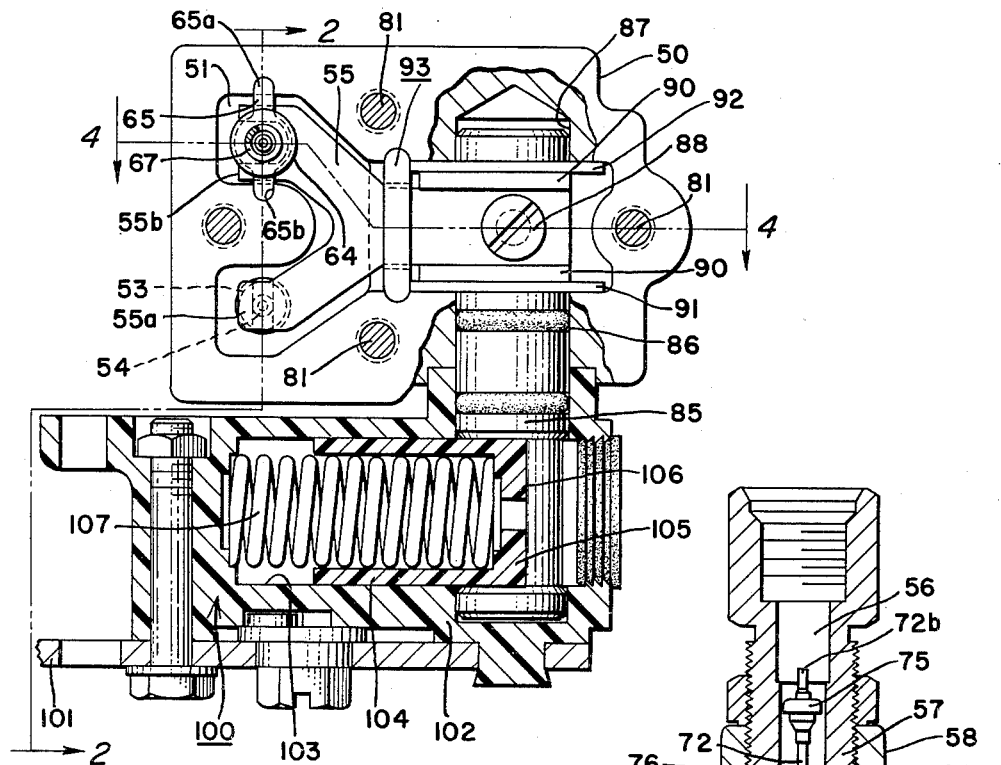
FIGURE 3 is a cross-sectional view taken substantially along line 3—3 of FIGURE 2.

A valve operating member 55 is secured to an oscillating shaft 85 supported in the valve body 50 in the journal bores 86 and 87, as illustrated in FIGURE 3, so that the shaft 85 can oscillate freely within the valve body. The valve operating member 55 is secured to the shaft 85 by means of a screw 88 that retains the valve operating member on a flat portion 89 of the shaft 85.

The member 55 has upwardly turned shoulders 90 engaged by the arms 91 and 92 of a spacer member 93 that is positioned between the shoulders 90 and the sidewalls of the chamber 51, as illustrated in FIGURE 3. The nylon spacer arms 91 and 92 prevent the shaft 85 from moving axially in its support bearings and also provides for self-lubrication between the nylon member and the surfaces engaged thereby. The nylon member 93 has a slot 95 that allows relatively free movement of the valve operating member 55 in a downward direction to provide for a longer than normal stroke of movement of the stem 63 of the first exhaust valve 60, and thereby allow closing of the valve closing element 75 on the seat 76 of the second exhaust valve 70 in a manner hereinafter described.

The oscillatable shaft 85 is actuated by an over-travel mechanism 100 that is connected to an actuating arm 101 that connects with the unsprung mass of the vehicle, such as the axle structure.

The over-travel mechanism 100 consists of a body member 102 having a bore 103 therein that receives a piston member 104 having its head portion 105 engaging a flat portion 106 on the oscillatable shaft 85. The head of the piston 104 is retained against the flat portion 106 of the shaft 85 by means of the compression spring 107. Thus, the oscillatable shaft 85 will be rotated on its axis by the over-travel mechanism as operated by the arm 101 to the same extent as the oscillation of the over-travel mechanism until the valve operating member 55 engages either its upper stop 110 or its lower stop 111, whereafter the over-travel mechanism rotates beyond the oscillatable movement of the shaft 85, the spring 107 allowing movement of the piston relative to the then stationary shaft 85. Thus, the stroke of movement between the axle and the chassis of the vehicle can be greater than the amount of oscillation required for opening and closing of the inlet and exhaust valves of the control valve 20.

In the normal operation of the height regulating valve or leveling valve 20, when load is increased in the vehicle, the valve operating member 55 will move upwardly to open the inlet valve 53 and allow air under pressure to be supplied to the air springs to compensate for the increased load. When the load is moved from the vehicle, the increase of air pressure in the air springs provided to compensate for the load will cause the body of the vehicle to rise above the normal predetermined height clearance value between the sprung and the unsprung mass of the vehicle. Under this condition, the valve operating member 55 will move downwardly, as viewed in FIGURES 2 and 4, to move the guide member 65 downwardly against the flange member 64 to open the exhaust valve element 62 and allow air to exhaust from the air springs through the exhaust valve 60 and thence through the then open exhaust valve 70 to the exhaust port 56 for return to the compressor.

In this normal operation of the height regulating or leveling valve 20, the valve stem portion 63b of the first exhaust valve 60 holds the valve stem 72 of the second exhaust valve 70 in a position that the valve closing element 75 will never engage the seat 76. Thus, during all normal operations of the control valve 20 in maintaining a predetermined clearance height value between the sprung mass and the unsprung mass of the vehicle, a predetermined clearance type value, the valve member 70 will never close.

However, as mentioned previously herein, it is desirable under certain conditions of operation of the vehicle to establish and maintain a clearance height value between the sprung mass and the unsprung mass of the vehicle that is above the normally maintained predetermined clearance height.

To obtain a clearance height above that normally maintained, a manually operated valve 125 is provided in the air suspension system, the valve 125 being adapted for selective operation by the operator of the vehicle. This valve 125 is adapted to connect the high-pressure inlet line 17 with the exhaust line 30 when the valve element 125a is rotated to connect ports 125b and 125c. Under this circumstance, high-pressure air from the air reservoir will be supplied into the exhaust line 30 and thence into the exhaust ports 56 of the control valve 20. When this occurs, the reverse flow of fluid pressure through the exhaust port 56 into chamber 59, exhaust valve 70 being open at this time, valve 60 will open because of the high-pressure urging against the closure element 62, the spring 67 having insufficient resistance to prevent opening of the valve element 62 from its seat on the body of the valve 60. With air under pressure being delivered through the exhaust valve 60 in reverse flow direction into chamber 51, air under pressure is thereby supplied to the air springs 13 to cause them to lift the chassis or body of the vehicle relative to the running gear and increase the clearance height therebetween. This relative movement between the chassis and running gear of the vehicle causes the valve operating member 55 to move downwardly, as viewed in FIGURES 2 and 4, thereby moving the guide member 65 downwardly against the flanged member 64 on the stem 63 of the exhaust valve 60 to compress the spring 67 and gradually increase the degree of opening of the valve element 62 relative to the seat on the body of the valve 60.

With the air under pressure being supplied to the air springs through the exhaust line 30 and through the exhaust valve 70 which is still open at this time and through the exhaust valve 60 which has been previously opened by the reverse flow of fluid pressure, the clearance height between the chassis and the running gear of the vehicle will continue to increase with continued downward movement of the valve actuating member 55 and continued opening of the valve element 62 relative to its seat in the valve 60.

This continued downward movement of the valve stem 63 of the valve 60 allows the end portion 63b of the valve stem also to move downwardly, as viewed in FIGURES 2 and 4, so that the flanged element 69 on the lower end portion of the valve stem 72 of valve 70 will move downwardly until the valve closure element 75 engages its seat 76 on the valve member 70 to close off further reverse flow of pressure fluid from the inlet port 56 into chamber 59 of the control valve and thereby stop further flow of pressure fluid into chamber 51 and into the air springs 13. When this occurs, upward movement of the chassis of the vehicle relative to the running gear will stop so that closure of the valve element 75 on its seat 76 of valve 70 will limit the maximum raising of the chassis of the vehicle relative to the running gear and thereby control maximum clearance height value between the chassis and the running gear. Under this condition of operation, the valve element 75 will control the clearance height position of the chassis relative to the running gear so that if fluid pressure should be lost from the air springs for any reason, valve 75 will open, because of upward movement of the valve control member 55, on lowering of the vehicle chassis relative to the running gear to admit additional under pressure to the air springs 13 and thereby restore the maximum clearance height value between the sprung mass and the unsprung mass of the vehicle.

While the embodiments of the present invention as herein disclosed constitute a preferred form, it is to be understood that other forms might be adopted.

What is claimed is as follows:

1. A height control valve or leveling valve for use in a fluid suspension system of a vehicle to establish and maintain multiple positions of predetermined clearance height of different values between the sprung mass and the unsprung mass of the vehicle, comprising, a valve body, inlet valve means in said body for controlling flow of fluid to a fluid suspension means, exhaust valve means comprising a first normally closed valve and a second normally open valve in series flow relationship with said first valve and on the down flow side of the first valve controlling flow of fluid relative to the said suspension means, and a valve operating member connected with said inlet and said exhaust valve means to operate the same to open said inlet in one direction of movement and in a second direction of movement to open said first exhaust valve on a first predetermined movement of said valve operating member with said second exhaust valve being closed by said first exhaust valve by extended opening movement of said first exhaust valve on a predetermined additional movement of said valve operating member to establish thereby multiple positions of clearance height at which exhaust of fluid from the suspension means is controllable.

2. A height control valve or leveling valve for use in a fluid suspension system of a vehicle to establish and maintain multiple positions of predetermined clearance height of different values between the sprung mass and the unsprung mass of the vehicle, comprising, a valve body, inlet valve means in said body for controlling flow of fluid to a fluid suspension means, exhaust valve means comprising a first normally closed valve and a second normally open valve in series flow relationship with said first valve and on the down flow side of the first valve controlling flow of fluid relative to the said suspension means, and a valve operating member connected with said inlet and said exhaust valve means to operate the same to open and close said first exhaust valve in one range of predetermined movement of said valve operating member and to open and close said second exhaust valve in a second range of predetermined additional movement of said valve operating member by means of said first exhaust valve while concurrently holding said first exhaust valve open so long as said valve operating member is operating in said second range to establish thereby multiple positions of clearance height at which exhaust of fluid from the suspension means is controllable.

3. A height control valve or leveling valve for use in a fluid suspension system of a vehicle to establish and maintain multiple positions of predetermined clearance height of different values between the sprung mass and the unsprung mass of the vehicle, comprising, a valve body, inlet valve means in said body for controlling flow of fluid to a fluid suspension means, exhaust valve means comprising a first normally closed valve and a second normally open valve in series flow relationship with said first valve and on the down flow side of the first valve controlling flow of fluid relative to the said suspension means, and a valve operating member connected with said inlet and said exhaust valve means to operate the same to open said first exhaust valve on predetermined movement of said valve operating member, said first exhaust valve having a valve stem member extending therefrom into engagement with said second exhaust valve to open and close the same thereby on predetermined additional opening movement of the valve stem of said first exhaust valve as opened by predetermined additional movement of said valve operating member, said first and second exhaust valves thereby establishing multiple positions of clearance height at which exhaust of fluid from the suspension means is controllable thereby.

4. A height control valve or leveling valve constructed and arranged in accordance with claim 3 wherein said first exhaust valve holds said second exhaust valve open at all times until said first exhaust valve is opened the said predetermined additional amount as operated by said valve operating member.

5. A height control valve or leveling valve for use in a fluid suspension system of a vehicle to establish and maintain multiple positions of predetermined clearance height of different values between the sprung mass and the unsprung mass of the vehicle, comprising, a valve body, an inlet passage containing inlet valve means in said body for controlling flow of fluid to a fluid suspension means, an exhaust passage containing exhaust valve means comprising a first normally closed valve and a second normally open valve in series flow relationship with said first valve and on the down flow side of the first valve controlling flow of fluid relative to the said suspension means, and valve operating means connecting with said inlet and said exahust valve means to operate the same, said first exhaust valve including a valve stem engaging said second exhaust valve to actuate the same and normally holding the same in open position so long as said valve operating means operates within a first range of predetermined movement, said stem of said first exhaust valve permitting said second exhaust valve to close when said valve operating means operates in a second predetermined additional range of movement beyond the first said range of movement thereof, said first and second exhaust valves thereby establishing multiple positions of clearance height at which exhaust of fluid from the suspension means is controllable thereby.

6. In a fluid suspension system for controlling multiple positions of clearance height between the unsprung mass and the sprung mass of a vehicle, a fluid spring positioned between an unsprung mass and a sprung mass of a vehicle, a fluid pressure source, control means responsive to changes in clearance height between the unsprung mass and the sprung mass having inlet valve means controlling supply of fluid from said source to said spring and having exhaust valve means comprising a first normally closed exhaust valve and a second normally open exhaust valve in series flow relationship with said first valve and on the down flow side of the first valve controlling exhaust of fluid from said spring to maintain thereby predetermined clearance height between the sprung mass and the unsprung mass, and means supplying fluid under pressure from said source to the exhaust flow side of said second exhaust valve in reverse to normal exhaust flow therefrom to effect opening of said first exhaust valve thereby for flow of fluid under pressure to said fluid spring to elevate said sprung mass relative to said unsprung mass until said second exhaust valve is permitted to close by said first exhaust valve against said reverse fluid flow to said fluid spring and control thereby maximum elevation of the sprung mass relative to the unsprung mass of the vehicle.

7. In a fluid suspension system for controlling multiple positions of clearance height between the unsprung mass and the sprung mass of a vehicle, a fluid spring positioned between an unsprung mass and a sprung mass of a vehicle, a fluid pressure source, control means responsive to changes in clearance height between the unsprung mass and the sprung mass having an inlet passage containing inlet valve means controlling supply of fluid from said source to said spring and having an exhaust passage containing exhaust valve means comprising a first normally-closed exhaust valve and a second normally open exhaust valve in series flow relationship with said first valve and on the down flow side of the first valve controlling exhaust of fluid from said spring to maintain thereby predetermined clearance height between the sprung mass and the unsprung mass, said first exhaust valve having a valve stem engaging said second exhaust valve to control actuation of said second exhaust valve by said first exhaust valve, valve operating means connected with said inlet valve means and said first exhaust valve to operate the same and actuated by a change in clearance height between the sprung mass and the unsprung mass of the vehicle, and means supplying fluid under pressure from said source to the exhaust side of said second exhaust valve in reverse to normal exhaust flow therefrom to effect thereby opening of said first exhaust valve for flow of fluid under pressure to said fluid spring to elevate said sprung mass relative to said unsprung mass and actuate thereby said valve operating means to operate said first exhaust valve means to hold the same in open position, said first exhaust valve permitting closing of said second exhaust valve against said reverse fluid flow to said fluid spring on predetermined extended opening movement of said first exhaust valve whereby to control maximum elevation of the sprung mass relative to the unsprung mass of the vehicle.

References Cited in the file of this patent
UNITED STATES PATENTS

| | | |
|---|---|---|
| 2,919,931 | Cislo | Jan. 5, 1960 |
| 2,962,297 | Cislo | Nov. 29, 1960 |